US008451335B2

(12) United States Patent
Kang

(10) Patent No.: US 8,451,335 B2
(45) Date of Patent: May 28, 2013

(54) IMAGING DEVICE

(75) Inventor: Woobum Kang, Osaka (JP)

(73) Assignee: Keyence Corporation, Osaka (JP)

( * ) Notice: Subject to any disclaimer, the term of this patent is extended or adjusted under 35 U.S.C. 154(b) by 813 days.

(21) Appl. No.: 12/613,572

(22) Filed: Nov. 6, 2009

(65) Prior Publication Data

US 2010/0149362 A1 Jun. 17, 2010

(30) Foreign Application Priority Data

Dec. 12, 2008 (JP) ................................ 2008-317075

(51) Int. Cl.
*H04N 5/225* (2006.01)
(52) U.S. Cl.
USPC ........................................ 348/207.11; 348/79
(58) Field of Classification Search
None
See application file for complete search history.

(56) References Cited

U.S. PATENT DOCUMENTS

| 4,760,385 | A | * | 7/1988 | Jansson et al. ................. 345/641 |
| 6,687,419 | B1 | * | 2/2004 | Atkin ............................. 382/284 |
| 7,424,218 | B2 | * | 9/2008 | Baudisch et al. ........... 348/218.1 |
| 2001/0055429 | A1 | * | 12/2001 | Hirosawa et al. ............. 382/284 |
| 2003/0122949 | A1 | * | 7/2003 | Kanematsu et al. ..... 348/333.01 |
| 2004/0119817 | A1 | * | 6/2004 | Maddison et al. .............. 348/79 |
| 2004/0189849 | A1 | * | 9/2004 | Hofer ....................... 348/333.03 |
| 2004/0218833 | A1 | * | 11/2004 | Ejiri et al. ................... 348/218.1 |
| 2008/0074489 | A1 | * | 3/2008 | Zhang et al. .................... 348/36 |

FOREIGN PATENT DOCUMENTS

| JP | 06-088989 | 3/1994 |
| JP | 08-181903 | 7/1996 |
| JP | 09-284542 | 10/1997 |
| JP | 09-322060 | 12/1997 |
| JP | 11-205675 | 7/1999 |
| JP | 11-264937 | 9/1999 |
| JP | 2000-090232 | 3/2000 |
| JP | 20003-087549 | 3/2003 |
| JP | 2004-343222 | 12/2004 |

* cited by examiner

*Primary Examiner* — Sinh Tran
*Assistant Examiner* — Jason Flohre
(74) *Attorney, Agent, or Firm* — Kilyk & Bowersox, P.L.L.C.

(57) ABSTRACT

This invention provides an imaging device includes: a mosaic image generation unit which assembles a plurality of still images, and generates a mosaic image; a feature quantity extraction unit which extracts feature quantity from the frame image and the mosaic image; a relative position determination unit which determines a relative position between the frame image and the mosaic image, and a live image display unit which updates a display position of the frame image with respect to the mosaic image, and displays the moving picture image on the mosaic image. The live image display unit changes the display position in response to the relative position when succeeded in positioning of the frame image; and when failed in positioning, the live image display unit does not change the display position and fixes the display position near a position of a final frame image succeeded in positioning.

9 Claims, 15 Drawing Sheets

REFERENCE IMAGE    MOSAIC IMAGE

LIVE IMAGE

LIVE IMAGE JUST BEFORE FAILING IN POSITIONING

LIVE IMAGE JUST AFTER FAILING IN POSITIONING

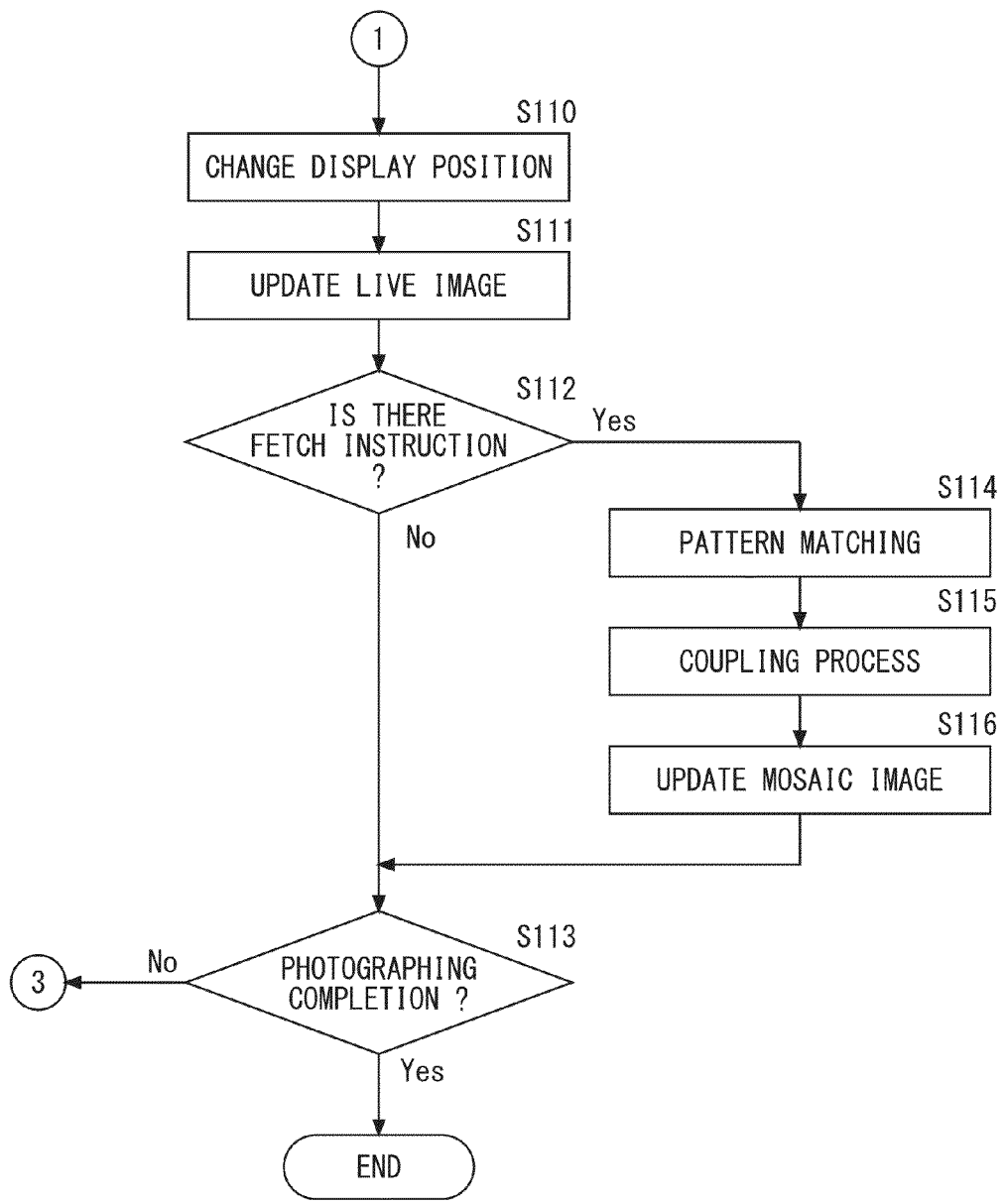

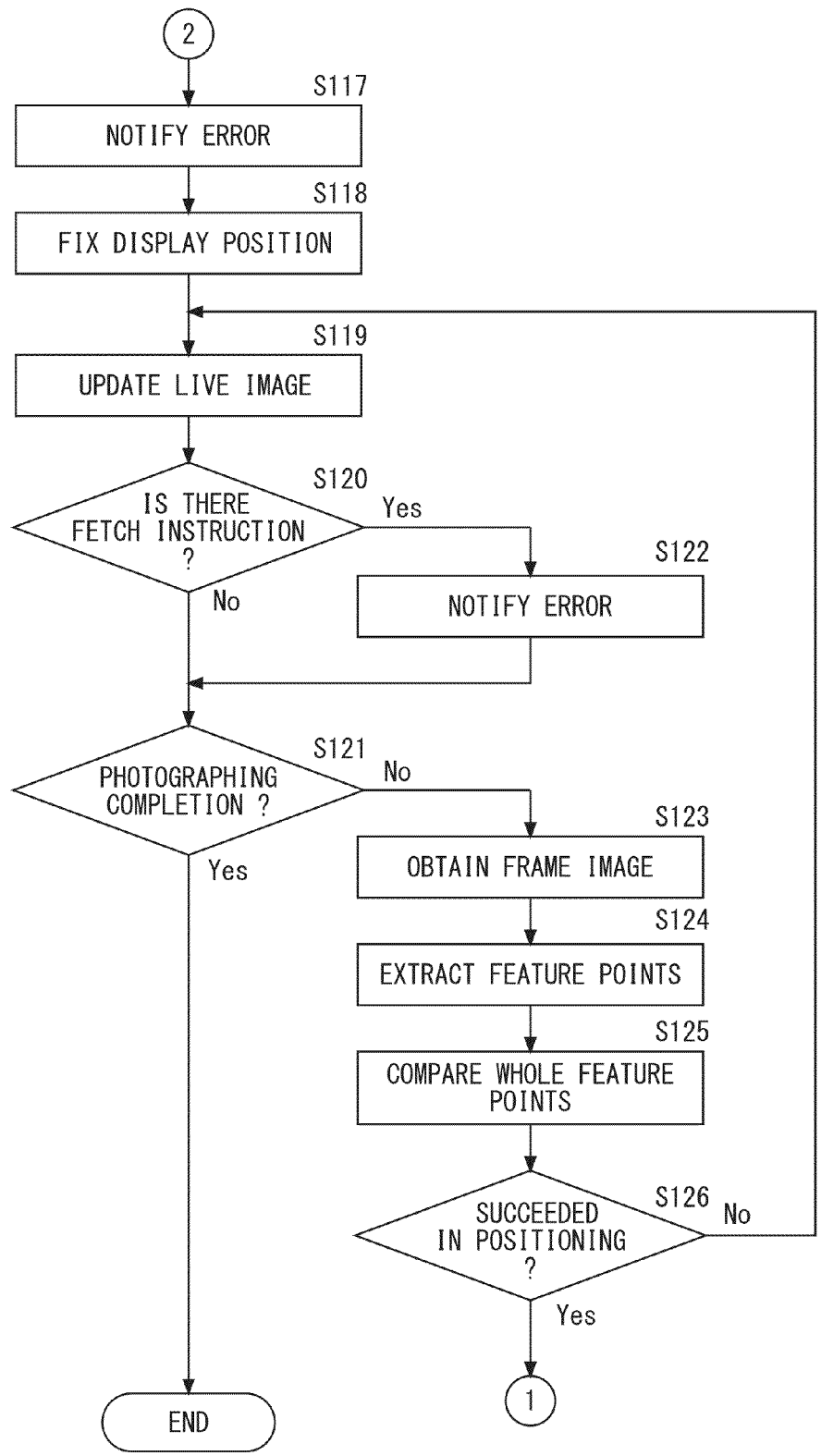

IMAGING DEVICE

CROSS-REFERENCE TO RELATED APPLICATIONS

The present application claims foreign priority based on Japanese Patent Application No. 2008-317075, filed Dec. 12, 2008, the contents of which is incorporated herein by reference.

BACKGROUND OF THE INVENTION

1. Field of the Invention

The present invention relates to imaging devices and, more particularly, relates to an imaging device capable of displaying a moving picture image, which is generated by a camera that photographs an object to be inspected, on a mosaic image that is wider in field of view than an actual field of view of the camera.

2. Description of the Related Art

An image mosaic is known in the related art as a technique which creates a sheet of an image with a wide field of view that is wider in field of view than an actual field of view of a camera by assembling a plurality of still images photographed while changing a field of view. In the case of an imaging device such as a digital microscope which photographs a photographic subject enlarged by an objective lens, a field of view can be changed by moving a movable stage on which an object to be inspected is mounted. The image with a wide field of view is called as a mosaic image, and is created by coupling the plurality of still images photographed while changing the field of view in such a manner based on a relative position between images.

For example, in the case of the known imaging device which is equipped with a sensor that detects a position of a movable stage and automatically photographs a photographing range specified by a user, a relative positional relationship between images is judged by control information of the movable stage, and assembly of still images is performed. In such imaging device, when the photographing range is specified and photographing is once started, the photographing range cannot be changed in mid-flow. Furthermore, the position of the movable stage needs to be highly accurately detected; and therefore, there is a problem in that system configuration becomes complicated and high cost.

On the other hand, there is also an imaging device in which a relative positional relationship between images is judged by pattern matching between the images and still images are assembled. However, there is no imaging device capable of fetching still images and coupling the same with a mosaic image while making a user confirm a positional relationship between a field of view during photographing and the mosaic image during creation on a display unit. Consequently, there is conceivable an imaging device in which still images are fetched at timing specified by a user and are assembled to a mosaic image while displaying a field of view during photographing as a moving image on the mosaic image. However, in the case where a relative position between a mosaic image and a frame image which constitutes a moving picture image is judged by pattern matching between these images and the moving picture image is displayed on the mosaic image, if failed in positioning of the frame image, there is a problem in that a positional relationship between the field of view during photographing and the mosaic image during creation becomes unclear.

BRIEF SUMMARY OF THE INVENTION

The present invention has been made in view of the above circumstances, and an object of the present invention is to provide an imaging device capable of easily recognizing a positional relationship between a field of view during photographing and a mosaic image during creation without complicating a system configuration. More particularly, another object of the present invention is to provide an imaging device which can easily recognize that it has failed in positioning of a frame image in the case of displaying a field of view during photographing as a moving picture image at an appropriate position on the mosaic image. In addition, further object of the present invention is to provide an imaging device capable of easily returning a field of view during photographing to a position capable of positioning.

An imaging device of a first aspect of the present invention includes: a movable stage capable of moving in two different directions while mounting an object to be inspected; a camera which is arranged in face-to-face relation to the movable stage, photographs the object to be inspected, and generates a moving picture image made of a plurality of continuous frame images; a mosaic image generation unit which assembles not less than two still images photographed by the camera, and generates a mosaic image that is wider in field of view than an actual field of view of the camera; a feature quantity extraction unit which extracts feature quantity from the frame image and the mosaic image; a relative position determination unit which determines a relative position between the frame image and the mosaic image by comparison of the feature quantity; and a live image display unit which updates a display position of the frame image with respect to the mosaic image based on a determination result of the relative position, and displays the moving picture image on the mosaic image, wherein the live image display unit changes the display position in response to the relative position when determined as having succeeded in positioning of the frame image by the relative position determination unit, and fixes the display position when determined as having failed in positioning of the frame image.

In the imaging device, by the comparison of the feature quantity extracted from the frame image and the mosaic image, the relative position between these images is determined and the moving picture image is displayed on the mosaic image based on its determination result; and therefore, a field of view during photographing can be displayed as the moving picture image at an appropriate position on the mosaic image during creation. According to such a configuration, the field of view during photographing is displayed as the moving picture image at the appropriate position on the mosaic image during creation; and therefore, it becomes possible to fetch the still image and couple the same to the mosaic image while making a user confirm a positional relationship between the field of view during photographing and the mosaic image during creation. More particularly, the display position of the moving picture image is changed in response to the relative position between the frame image and the mosaic image when succeeded in positioning of the frame image; on the other hand, when failed in positioning, the display position is fixed; and therefore, the display position can be fixed by a final frame image succeeded in positioning. Thus, in the case where the field of view during photographing is displayed as the moving picture image at the appropriate position on the mosaic image, even when the visual field is moved after failed in positioning, the display position of the moving picture image is retained while being fixed; and therefore, it becomes possible to easily recognize that it has failed in positioning of the frame image. Furthermore, the relative position between these images is determined by the comparison of the feature quantity extracted from the frame image and the mosaic image; and therefore, it becomes possible to suppress system configuration from being complicated.

In the imaging device of a second aspect of the present invention, in addition to the above configuration, the live image display unit fixes the display position near a display position of a final frame image determined as having succeeded in positioning. According to such a configuration, in the case where the field of view during photographing is displayed as the moving picture image at the appropriate position on the mosaic image, the display position of the moving picture image is fixed near the display position of the frame image finally determined as having succeeded in positioning; and therefore, it becomes possible to easily return the field of view during photographing to a position capable of positioning.

In the imaging device of a third aspect of the present invention, in addition to the above configuration, after failing in positioning of the frame image, the live image display unit fixes the display position to the display position of the final frame image, displays a newly obtained frame image, and updates the frame image displayed at the display position to the newly obtained frame image, so that the display of the moving picture image is continued. According to such a configuration, after failing in positioning of the frame image, the display of the moving picture image is continued while fixing the display position; and therefore, it becomes possible to easily return the field of view during photographing to a position capable of positioning.

In the imaging device of a fourth aspect of the present invention, in addition to the above configuration, in the case of extracting the feature quantity from the mosaic image, the feature quantity extraction unit sets a still image finally assembled with respect to the mosaic image as a reference image and extracts feature quantity in the reference image; and wherein, for a frame image to be obtained after failing in positioning of the frame image, the relative position determination unit determines a relative position between the frame image and the mosaic image by comparing the feature quantity in the frame image and the feature quantity in the reference image, and determines the relative position by comparing the feature quantity in the frame image and feature quantity in an image area excluding the reference image of the mosaic image in the case where the relative position cannot be determined by the comparison with the feature quantity in the reference image.

In the imaging device of a fifth aspect of the present invention, in addition to the above configuration, in the case where the relative position cannot be determined even by the comparison of feature quantity of the whole of the frame image and feature quantity of the whole of the reference image, the relative position determination unit sets a still image adjacent to the still image finally assembled with respect to the mosaic image as a reference image and determines the relative position by comparing feature quantity of the whole of this reference image and the feature quantity of the whole of the frame image. According to such a configuration, in the case where the relative position cannot be determined even by the comparison of the feature quantity of the whole of the frame image and the whole of the former reference image, the relative position is determined by comparing the feature quantity of the whole of the still image adjacent to the finally assembled still image and the feature quantity of the whole of the frame image; and therefore, it becomes possible to improve positioning accuracy between the frame image and the mosaic image while suppressing a processing load from increasing.

In the imaging device of a sixth aspect of the present invention, in addition to the above configuration, for a frame image obtained after failing in positioning, the relative position determination unit determines the relative position by comparing feature quantity included in a peripheral portion of the mosaic image and feature quantity of the whole of the frame image. According to such a configuration, after failing in positioning, the relative position is determined by comparing the feature quantity included in a peripheral portion of the mosaic image and the feature quantity of the whole of the frame image; and therefore, it becomes possible to improve positioning accuracy between the frame image and the mosaic image while suppressing a processing load from increasing.

In the imaging device of a seventh aspect of the present invention, in addition to the above configuration, in the case of extracting feature quantity from the mosaic image, the feature quantity extraction unit sets a still image finally assembled with respect to the mosaic image as a reference image and extracts feature quantity in the reference image; and wherein the relative position determination unit estimates an overlapping area between the frame image and the reference image based on a determination result of a past relative position and determines the relative position by comparing feature quantity in the overlapping area, and determines the relative position by comparing feature quantity of the whole of the frame image with feature quantity of the whole of the reference image in the case where the relative position cannot be determined by the comparison of the feature quantity in the overlapping area. According to such a configuration, the relative position between the frame image and the mosaic image is determined by comparing the feature quantity in the overlapping area between the frame image and the reference image, estimated from the determination result of the past relative position. On the other hand, in the case where the relative position cannot be determined by the comparison of feature quantity in the overlapping area, the relative position is determined by comparing the feature quantity of the whole of these images; and therefore, it becomes possible to improve positioning accuracy between the frame image and the mosaic image while suppressing a processing load from increasing.

In the imaging device of an eighth aspect of the present invention, in addition to the above configuration, the live image display unit displays in a display mode different from the case where the frame image determined as having failed in positioning is determined as having succeeded. According to such a configuration, the frame image failed in positioning is displayed in a different display mode from the succeeded frame image; and therefore, it becomes possible to easily recognize that it has failed in positioning of the frame image.

The imaging device of a ninth aspect of the present invention, in addition to the above configuration, further includes: a positioning reduction section which reduces the frame image constituting the moving picture image and generates a positioning frame image, and reduces the mosaic image and generates a positioning mosaic image; and a display reduction unit which reduces a frame image constituting the moving picture image and generates a display frame image, and reduces the mosaic image and generates a display mosaic image, and wherein the feature quantity extraction unit extracts feature quantity from the positioning frame image and the positioning mosaic image; the relative position determination unit determines a relative position between the positioning frame image and the positioning mosaic image; the live image display unit displays the moving picture image configured by the display frame image on the display mosaic image as a live image; and the mosaic image generation unit estimates the relative position between the frame image and the mosaic image by higher resolution than the positioning mosaic image and assembles the frame image to the mosaic image and generates a new mosaic image.

An imaging device of a tenth aspect of the present invention includes: a movable stage capable of moving in two different directions while mounting an object to be inspected; a position sensor which detects a position of the movable stage; a camera which is arranged in face-to-face relation to the movable stage, photographs the object to be inspected, and generates a moving picture image made of a plurality of continuous frame images; a mosaic image generation unit which assembles not less than two still images photographed by the camera, and generates a mosaic image that is wider in field of view than an actual field of view of the camera; a relative position determination unit which determines a relative position between the frame image and the mosaic image based on output of the position sensor; and a live image display unit which updates a display position of the frame image with respect to the mosaic image based on a determination result of the relative position, and displays the moving picture image on the mosaic image, wherein in the case where the still image corresponding to the frame image cannot be smoothly coupled to the mosaic image, the live image display unit fixes the display position. According to such a configuration, in the case where the still image corresponding to the frame image cannot be smoothly coupled to the mosaic image, the display position of the moving picture image is fixed; and therefore, it becomes possible to make a user recognize that the field of view during photographing cannot be smoothly coupled to the mosaic image during creation.

According to an imaging device of the present invention, a field of view during photographing is displayed as a moving picture image at an appropriate position on a mosaic image during creation; and therefore, it becomes possible to fetch a still image and couple the same to a mosaic image while making a user confirm a positional relationship between the field of view during photographing and the mosaic image during creation. More particularly, a display position of a moving picture image is changed in response to a relative position between a frame image and a mosaic image when succeeded in positioning of a frame image. On the other hand, the display position is fixed when failed in positioning; and therefore, the display position can be fixed by a final frame image succeeded in positioning. Therefore, in the case where the field of view during photographing is displayed as the moving picture image at an appropriate position on the mosaic image, even when the visual field is move after failed in positioning, the display position of the moving picture image is retained while being fixed; and therefore, it becomes possible to easily recognize that it has failed in positioning of the frame image. Furthermore, the relative position between these images is determined by comparison of feature quantity extracted from the frame image and the mosaic image; and therefore, it becomes possible to suppress a system configuration from being complicated. Thus, it becomes possible to easily recognize a positional relationship between the field of view during photographing and the mosaic image during creation without complicating the system configuration.

Furthermore, according to an imaging device of the present invention, in the case where a field of view during photographing is displayed as a moving picture image at an appropriate position on a mosaic image, a display position of the moving picture image is fixed near a display position of a frame image finally determined as having succeeded in positioning; and therefore, it becomes possible to easily return the field of view during photographing to a position capable of positioning.

BRIEF DESCRIPTION OF THE SEVERAL VIEWS OF THE DRAWING

FIG. 14 is a flow chart showing an example of operation during displaying a live image in the magnification observation device shown in FIG. 1; and FIG. 15 is a flow chart showing an example of operation during displaying the live image in the magnification observation device shown in FIG. 1.

DETAILED DESCRIPTION OF THE INVENTION

<Magnification Observation Device>

Figure 1:
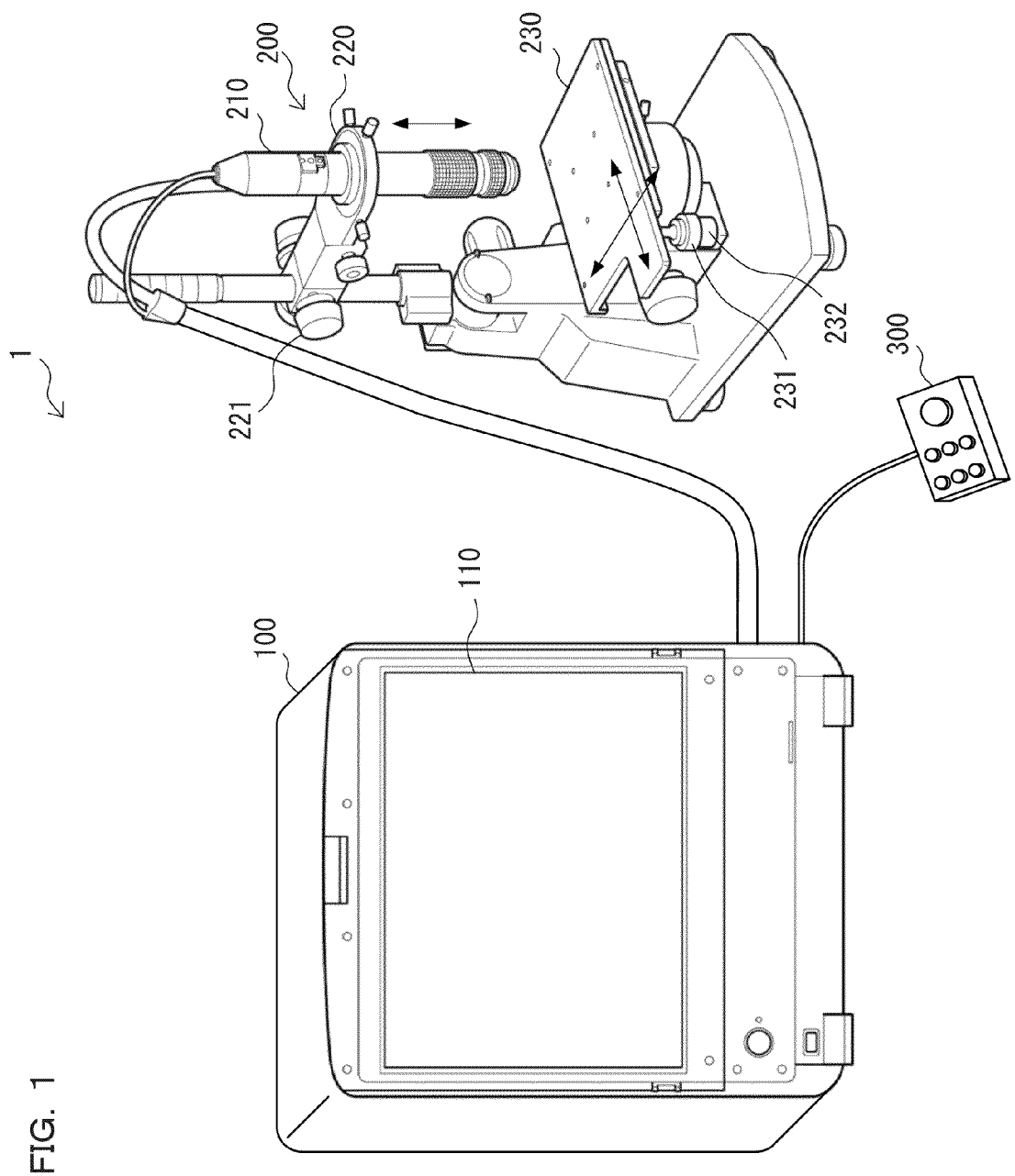
FIG. 1 is a view showing an example of a schematic configuration of an imaging device according to a preferred embodiment of the present invention, and showing a magnification observation device as an example of the imaging device.

FIG. 1 is a system view showing an example of a schematic configuration of an imaging device according to a preferred embodiment of the present invention; and as an example of the imaging device, there is shown a magnification observation device 1 which includes a system body 100, a camera unit 200, and a console 300. The magnification observation device 1 is a digital microscope which generates a moving picture image by photographing a photographic subject enlarged by an objective lens and can display the moving picture image on a display unit 110 of the system body 100.

The camera unit 200 is a photographing unit which is for photographing an object to be inspected while changing a field of view, and includes a camera 210, a movable holder 220, and a movable stage 230. The camera 210 is a read device which photographs the object to be inspected as the photographic subject and generates a moving picture image made of a plurality of frame images that continue at a constant frame rate, and is configured by arranging an objective lens, a charge coupled device (CCD) image sensor, an illumination device, and the like in a cylindrical housing.

The movable holder 220 is a retention unit which movably retains the camera 210 in a direction parallel to a central axis of the objective lens. In this case, the direction parallel to the central axis of the objective lens of the camera 210 is referred to as a z axis direction, and a position of the z axis direction of the camera 210 can be adjusted by turning a positional adjustment knob 221.

The movable stage 230 is a retention unit which retains the object to be inspected, and is movable in the face which is intersected with the z axis in a state where the object to be inspected is mounted. In this case, a plain face perpendicular to the z axis is referred to as an xy plain face, a position in the xy plain face of the movable stage 230 can be adjusted by turning positional adjustment knobs 231 and 232. That is, the movable stage 230 is a stage which can move in two different directions while mounting the object to be inspected by turning the positional adjustment knobs 231 and 232.

More specifically, a position of an x axis direction is adjusted by turning the positional adjustment knob 231, and a position of a Y axis direction can be adjusted by turning the positional adjustment knob 232. The camera 210 is arranged in face-to-face relation to such movable stage 230.

The console 300 is an input device which is for instructing start and completion of photographing, fetch of photographed image data, and the like to the system body 100.

The system body 100 is an image process device which displays the moving picture image photographed by the camera 210 on the display unit 110 and generates a mosaic image that is wider in field of view than the actual field of view of the camera 210 by assembling the frame images which constitute the moving picture image.

<System Body>

Figure 2:
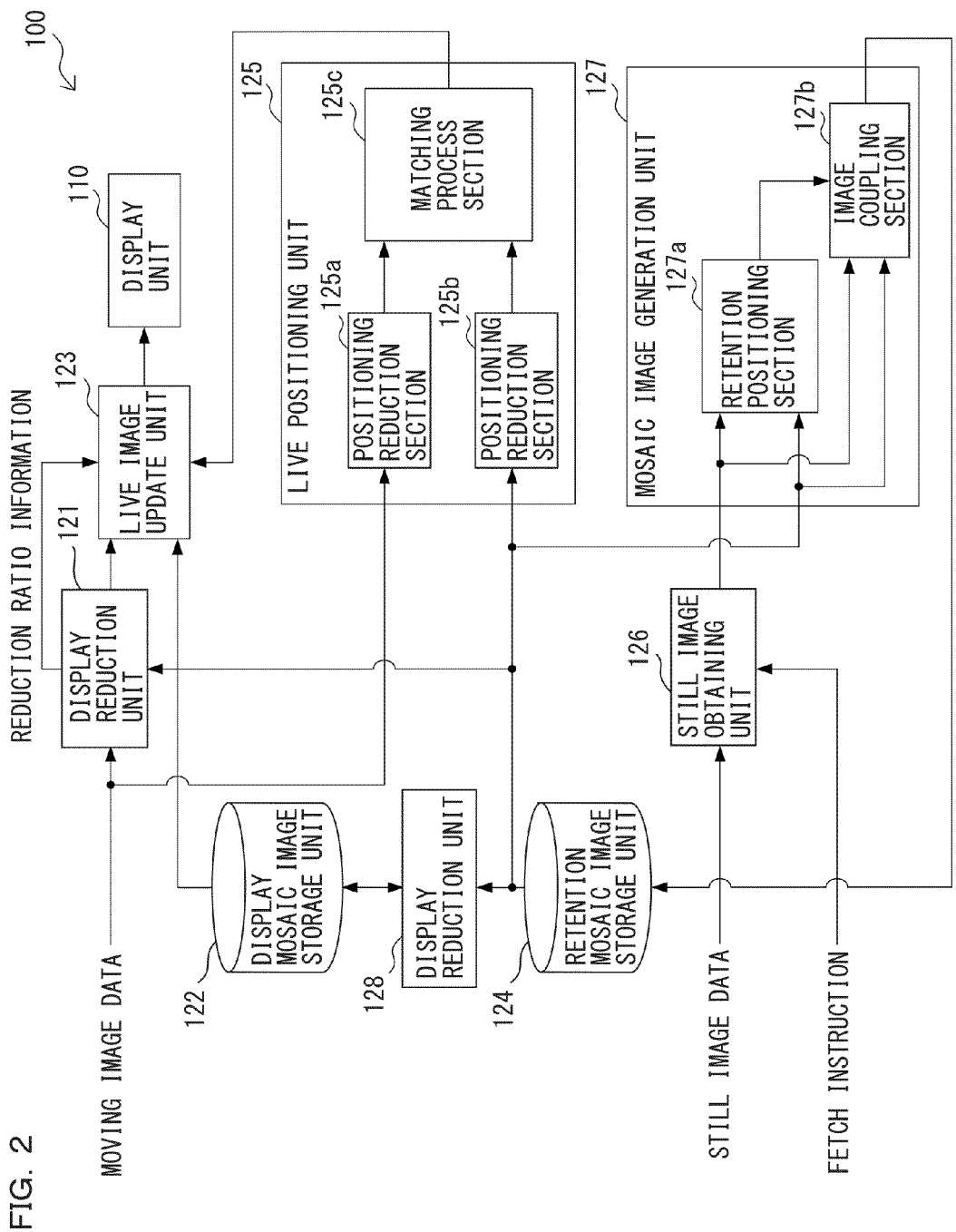
FIG. 2 is a block diagram showing a configuration example in a relevant portion of the magnification observation device shown in FIG. 1, and showing an example of a functional configuration in a system body.

FIG. 2 is a block diagram showing a configuration example in a relevant portion of the magnification observation device 1 shown in FIG. 1, and showing an example of a functional configuration in the system body 100. The system body 100 is configured by providing display reduction units 121 and 128, a display mosaic image storage unit 122, a live image update unit 123, a retention mosaic image storage unit 124, a live positioning unit 125, a still image obtaining unit 126, and a mosaic image generation unit 127, in addition to the display unit 110.

The display reduction unit 121 operates to process moving image data obtained from the camera 210, and to generate reduced moving image data having reduced image size. More specifically, operation is performed that the display reduction unit 121 reduces the frame image continuously obtained from the camera 210 at a predetermined reduction ratio, generates a display frame image, and outputs the same to the live image update unit 123. Reduction of the frame image is performed, for example, by a pixel skipping process and averaging procedure of pixel values. In this case, a reduction process is performed so as not to change an aspect ratio, that is, an aspect ratio of the frame image before and after the reduction.

The display mosaic image storage unit 122 is a mosaic image retention unit which retains a display mosaic image, and is configured by, for example, a volatile semiconductor memory. The live image update unit 123 operates to control the display unit 110 based on reduction ratio information sent from the display reduction unit 121 and to update a display position of the display frame image continuously obtained from the display reduction unit 121 with respect to the display mosaic image, and accordingly to display a live image on the display mosaic image. The live image is a moving picture image which is made of a plurality of continuous display frame images.

The retention mosaic image storage unit 124 is a mosaic image retention unit which retains a retention mosaic image, and is configured by a nonvolatile memory element, for example, a hard disk drive (HDD).

The live positioning unit 125 includes positioning reduction sections 125a and 125b, and a matching process section 125c. The live positioning unit 125 operates to reduce the frame images continuously obtained from the camera 210 and the retention mosaic image read out from the retention mosaic image storage unit 124, respectively and to perform a matching process.

The positioning reduction section 125a operates to reduce the frame image obtained from the camera 210 at a constant reduction ratio for positioning, to generate a positioning frame image, and to output the same to the matching process section 125c. The positioning reduction section 125b operates to reduce the retention mosaic image read out from the retention mosaic image storage unit 124 at a constant reduction ratio for positioning, to generate a positioning mosaic image, and to output the same to the matching process section 125c.

The matching process section 125c operates to use pattern matching between the positioning frame image and the positioning mosaic image to determine a relative position therebetween, to generate relative position information, and to output the same to the live image update unit 123.

The live image update unit 123 operates to decide a relative position between the display frame image and the display mosaic image based on relative position information received from the live positioning unit 125, and to update a display position of the display frame image with respect to the display mosaic image of the frame image for display.

The still image obtaining unit 126 operates to obtain a still image photographed by the camera 210 based on a fetch instruction from the console 300, and to output the same to the mosaic image generation unit 127. The assembling still image obtained from the camera 210 may be an image that is different in imaging conditions such as an exposure time from a moving picture image or may be one of the frame images which constitute the moving picture image.

The mosaic image generation unit 127 includes the retention positioning section 127a and an image coupling section 127b, and operates to generate a retention mosaic image by assembling a plurality of still images.

The retention positioning section 127a operates to determine a relative position between the still image obtained by the still image obtaining unit 126 and the retention mosaic image read out from the retention mosaic image storage unit 124. The determination of the relative position is performed by pattern matching between the still image and the retention mosaic image, and the relative position between the still image and the retention mosaic image is estimated at higher resolution than that of the positioning mosaic image.

The image coupling section 127b operates to assemble the still image and the retention mosaic image based on a determination result by the retention positioning section 127a, to generate a new retention mosaic image, and to update the retention mosaic image in the retention mosaic image storage unit 124. More specifically, the still image obtained by the still image obtaining unit 126 and the retention mosaic image read out from the retention mosaic image storage unit 124 are assembled based on the relative position between the images estimated by the retention positioning section 127a, so that the new retention mosaic image is generated.

The assembly of the still image and the retention mosaic image is performed by coupling both images based on the relative position between these images. Furthermore, in the case of coupling the still image and the retention mosaic image, a blending process of pixel values is performed for an overlapping area of both images in order to make a join less noticeable. The blending process is an image process which performs weighted average of pixel values between both images and obtains a pixel value of a composite image, and weight in the case of performing weighted average is appropriately changed in response to a pixel position, which makes the join less noticeable.

The display reduction unit 128 operates to read out an updated retention mosaic image from the retention mosaic image storage unit 124 each time the retention mosaic image is updated, to reduce the read out retention mosaic image for display, and to generate the display mosaic image.

In this case, the live positioning unit 125 executes a lower accurate matching process as compared with the retention positioning section 127a, and becomes a process unit which outputs low accurate coordinate data as the relative position information.

<Matching Process Section>

Figure 3:
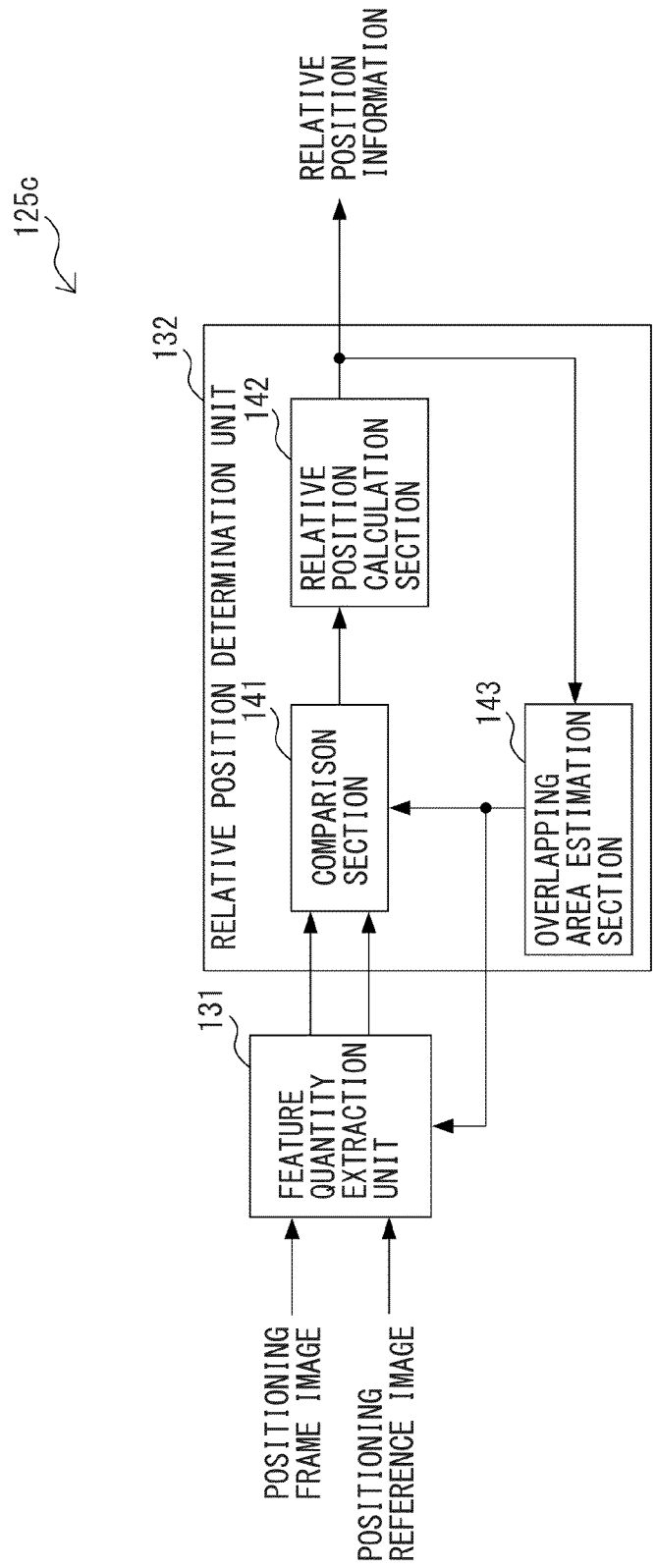
FIG. 3 is a block diagram showing a configuration example of a live positioning unit in a system body shown in FIG. 2, and showing a functional configuration in a matching process section.

FIG. 3 is a block diagram showing a configuration example of a live positioning unit 125 in the system body 100 shown in FIG. 2, and showing an example of a functional configuration in the matching process section 125c. The matching process section 125c includes a feature quantity extraction unit 131 and a relative position determination unit 132.

The feature quantity extraction unit 131 operates to extract feature quantity from the positioning frame image and the positioning mosaic image, respectively. As the feature quantity, any feature quantity may be used as long as the feature quantity becomes a marker in the case of comparing images; however, in this case, the top in which a plurality of edges are intersected is extracted as a feature point.

From the view point of shortening a process time required for positioning in the case where the size of a retention mosaic image becomes large, the feature quantity extraction unit 131 sets a part of the retention mosaic image, for example, a still image finally assembled with respect to the retention mosaic image as a reference image and extracts the feature point in the reference image in the case of extracting the feature point from a positioning mosaic image.

The relative position determination unit 132 includes a comparison section 141, a relative position calculation section 142, and an overlapping area estimation section 143. The relative position determination unit 132 operates to determine a relative position between the positioning frame image and the positioning mosaic image by comparison of the feature points. The comparison section 141 operates to compare a feature point extracted from the positioning frame image with a feature point extracted from the positioning mosaic image, and to output its comparison result to the relative position calculation section 142.

The comparison of the feature points is performed, for example, by extracting an area including a feature point from one pixel as a template and by searching an area most similar to the template area from the other image. As an index which measures the degree of similarity between the areas, there are conceivable a method of using error sum of squares of a luminance value obtained for a pixel in the area and a method of using normalized correlation in which a luminance value of each pixel in the area is normalized by average luminance.

In the case of comparing the feature point extracted from the positioning frame image with the feature point extracted from the positioning mosaic image, the comparison section 141 operates to compare the feature point of the positioning frame image with the feature point of the reference image.

The relative position calculation section 142 operates to determine the relative position between the positioning frame image and the positioning mosaic image based on the comparison result by the comparison section 141, to output its determination result to the overlapping area estimation section 143, and to output the relative position information to the live image update unit 123.

The overlapping area estimation section 143 operates to estimate an overlapping area of the present positioning frame image and the positioning mosaic image based on the determination result of the past relative position related to the positioning frame image. For example, operation is performed that an overlapping area of the frame image and the positioning mosaic image is set from the determination result of a relative position related to a positioning frame image previously provided by one frame, and the overlapping area is judged as the overlapping area of the present frame image and the mosaic image.

In the case of estimating the overlap area of the present positioning frame image and the positioning mosaic image, the overlapping area estimation section 143 operates to estimate an overlap area of the positioning frame image and the positioning reference image.

The comparison section 141 operates to compare feature points in the overlapping area estimated by the overlapping area estimation section 143, and to outputs a comparison result to the relative position calculation section 142. Then, as a result of comparing the feature points in the overlapping area, and in the case where the relative position cannot be determined, the comparison section 141 operates to compare the whole feature points included in the whole of the positioning frame image with the whole feature points included in the whole of the positioning reference image that is an object of a matching process of the positioning mosaic image, and to output the comparison result to the relative position calculation section 142.

That is, the relative position calculation section 142 operates to determine the relative position based on the comparison result of the feature points in the overlapping area between the frame image and the reference image estimated from the determination result of the past relative position. On the other hand, in the case where the relative position cannot be determined by the comparison of the feature points in such overlapping area, the relative position calculation section 142 operates to determine the relative position based on the comparison result of the feature points of the whole of the positioning frame image and the feature points of the whole of the reference image.

Furthermore, as for a first positioning frame image, operation is performed to compare the whole feature points included in the whole of the positioning frame image with the whole feature points included in the whole of the reference image, and to output a comparison result to the relative position calculation section 142. That is, as for a first positioning frame image, the relative position is determined by comparing the whole feature points of the frame image with the whole feature points of the reference image. On the other hand, as for a positioning frame image subsequent to a second frame, first, the feature points in the overlapping area estimated from the determination result of the past relative position related to the frame image are compared and the relative position is determined. At this time, if the relative position cannot be determined, the whole feature points of the frame image and the whole feature points of the reference image are compared and the relative position is determined.

In this case, the first frame image is, for example, a first obtained frame image after restarting photographing in the case where photographing is once stopped in the middle of creating the mosaic image and photographing is restarted.

Generally, in the case where each feature point is extracted from two still images in which each part of the images is overlapped and a group of corresponding feature points is searched between these images, a way of extracting the feature point from the overlapping area of both images and searching the group of corresponding feature point becomes lower in the occurrence probability of false response than that of searching by extracting the feature point from the whole of the images. That is, comparison is preferentially made for the feature point in the overlapping area to determine the relative position; and accordingly, a probability of succeeding in positioning of the positioning frame image can be improved. Further, positioning speed can be improved as compared with the comparison is made for the whole feature points in the screen.

In this case, when the feature quantity extraction unit 131 extracts the feature point from the present positioning frame image, the feature point is extracted from the overlapping area estimated by the overlapping area estimation section 143. Then, in the case where the relative position cannot be determined by only the feature point in the overlapping area, operation of extracting the feature point from an area other than the overlapping area is also performed.

Further, the live image update unit 123 operates to update a display positioning in the case of displaying the moving picture image which is made of the display frame images on the display mosaic image as the live image based on the determination result of the relative position by the relative position calculation section 142, and to output its display data to the display unit 110.

At that time, when determined as having succeeded in positioning of the frame image by the relative position determination unit 132, operation is performed to change the display position of the live image in response to the determination result of the relative position. On the other hand, when the relative position cannot be determined and when determined as having failed in positioning of the frame image, the display position of the live image is not changed; however, for example, operation is performed to fix the display position of the live image near the display position of a final frame image determined as having succeeded in positioning.

That is, after failed in positioning of the frame image, the display position of the live image is fixed to the display position of the final frame image having succeeded in positioning to display a newly obtained frame image, and the frame image displayed on the display position is updated to the newly obtained frame image; and accordingly, the display of the live image is continued.

In this case, the reference image is changed as needed so that a still image that is the largest in area of the overlapping area with the frame image in the still image which constitutes the mosaic image always becomes the reference image. Then, when the relative position cannot be determined with respect to such reference image, judgment is made that it has failed in positioning of the frame image.

Furthermore, as for a frame image obtained after failing in positioning of the frame image, the relative position between the frame image and the mosaic image is determined by comparing the feature quantity in the frame image and the feature quantity in the reference image. Then, in the case where the relative position cannot be determined by the comparison of the feature quantity in the reference image, operation is performed to determine the relative position by comparing the feature quantity in the frame image and the feature quantity in the image area excluding the reference image of the mosaic image.

That is, if succeeded in positioning of the frame image in the previous positioning, the overlapping area between the present frame image and the reference image is estimated based on the relative position information of the frame image succeeded in positioning, and the relative position is determined by the comparison of the feature points in the overlapping area (referred to as a high speed following mode). On the other hand, if failed in positioning of the frame image, the operation mode is switched from the high speed following mode to a field of view searching mode. As for the frame image obtained after failing in positioning, the relative position is determined by comparing the feature quantity in the frame image and the feature quantity in the reference image. If the relative position cannot be determined by the comparison with the feature quantity in the reference image, the relative position is determined by comparing the feature quantity of the frame image and the feature quantity of the image area other than the reference image of the mosaic image.

Furthermore, in the live image update unit 123, a display mode which is different from the case where the frame image determined as having failed in positioning is determined as having succeeded, for example, operation is performed to invert white and black and to display by changing color. Alternatively, a direction which increases an overlap of the reference image and the frame image is judged from update record of the display position of the frame image with respect to the mosaic image, and an arrow or the like showing the direction may be displayed. Furthermore, as error notification in the case of failing in positioning of the frame image, operation is made to display a message showing that it has failed in positioning as an error message having failed in positioning, or to output a warning sound.

<Live Screen>

Figure 4:
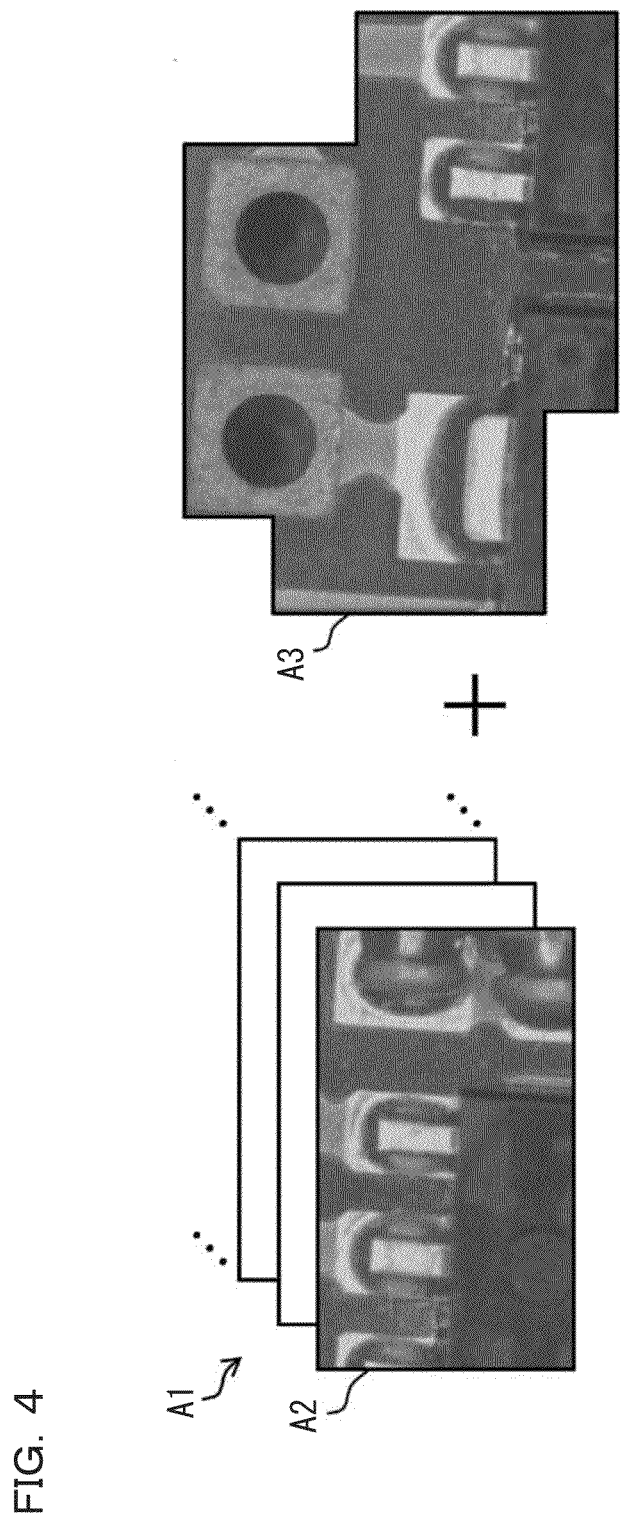
FIG. 4 is an explanation view exemplarily showing an example of operation during displaying a live image in the magnification observation device shown in FIG. 1, and showing a moving picture image A1 and a display mosaic image A3.
Figure 5:
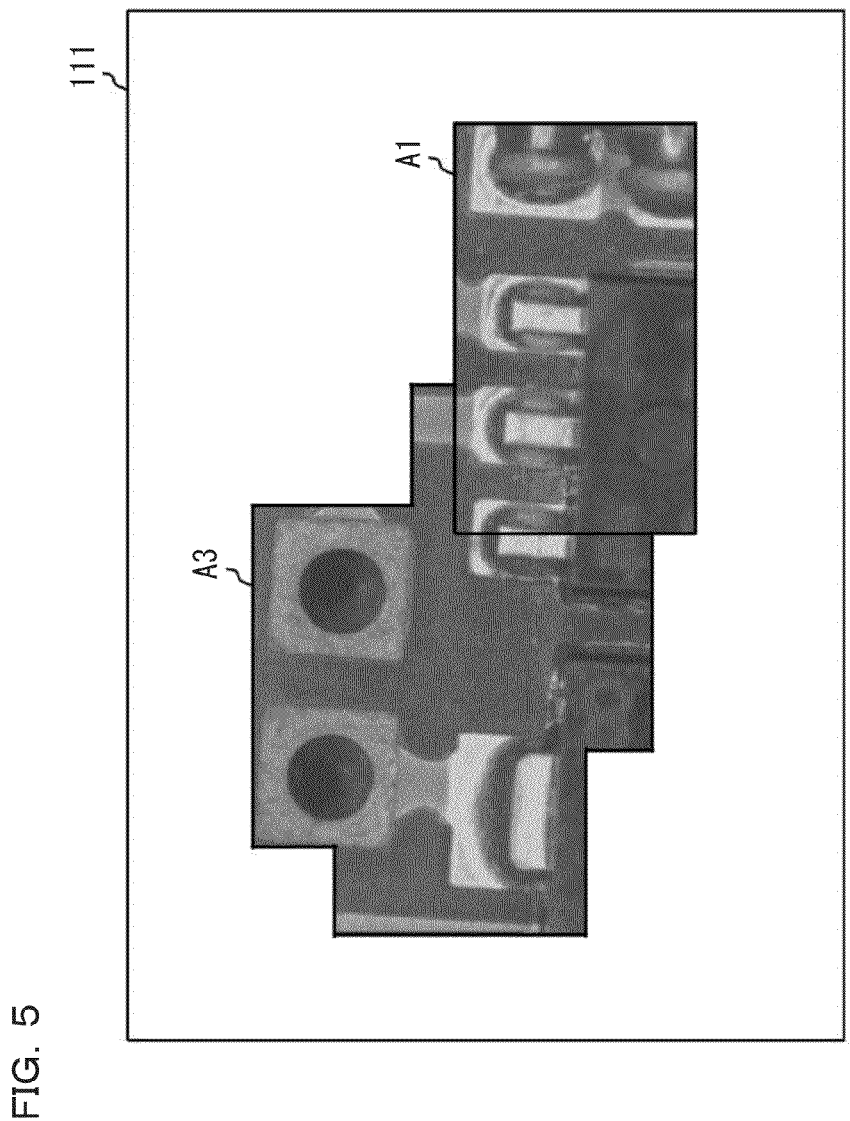
FIG. 5 is an explanation view exemplarily showing an example of operation during displaying a live image of the magnification observation device shown in FIG. 1, and showing a live screen.

FIGS. 4 and 5 are explanation views each exemplarily showing an example of operation during displaying the live image in the magnification observation device 1 shown in FIG. 1. FIG. 4 shows a moving picture image A1 and a display mosaic image A3 photographed by the camera 210. Furthermore, FIG. 5 shows a live screen 111 in which the moving picture image A1 is arranged as the live image on the mosaic image A3.

The moving picture image A1 is made of display frame images A2 which are repeatedly generated at a constant frame rate. For example, the display frame image A2 is generated at 15 frames per second (fps). In this case, imaging magnification and a focus position are fixed.

The display mosaic image A3 is a mosaic image which is created by reducing the retention mosaic image for displaying the live screen.

The live screen 111 is a monitor screen displayed on the display unit 110, and the display mosaic image A3 and the moving picture image A1 during creation are displayed thereon. In the live screen 111, the moving picture image A1 is arranged at a display position which is decided from the relative position determined by pattern matching between the present positioning frame image and the positioning mosaic image.

That is, the moving picture image A1 during photographing is displayed as the live image at an appropriate position on the display mosaic image A3 during creation; and therefore, a user can fetch still images and couple the same to the retention mosaic image while confirming a positional relationship between a field of view during photographing and the mosaic image during creation.

<Pattern Matching>

Figure 6A:
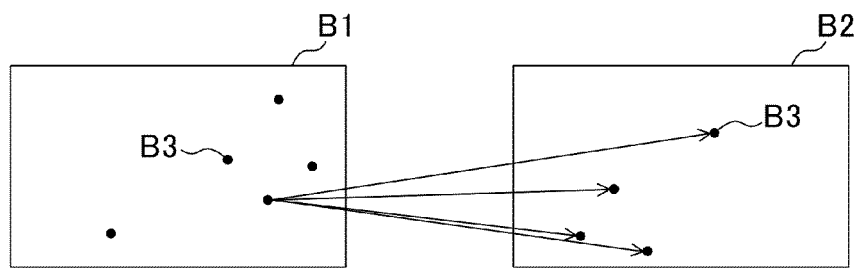
FIGS. 6A and 6B are diagrams each showing an example of operation of pattern matching in the magnification observation device shown in FIG. 1, and showing a state in which right correspondence between feature points is extracted by comparison of the whole feature points B3.
Figure 6B:
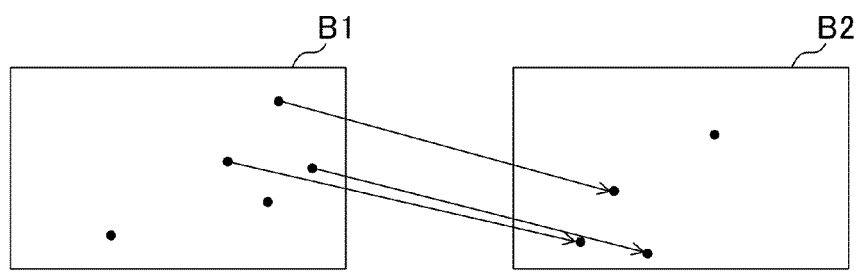

FIGS. 6A and 6B are diagrams each showing an example of operation of pattern matching in the magnification observation device 1 shown in FIG. 1, and there is shown a state in which right correspondence between these feature points is extracted by comparison of the whole feature points B3 each extracted from the reference image B1 and the positioning frame image B2. FIG. 6A shows a state in which the feature point B3 extracted from the reference image B1 is compared with each feature point B3 in the frame image B2; and FIG. 6B shows the right correspondence between the feature points extracted based on the comparison of the feature point B3.

The reference image B1 is a part of the mosaic image during creation and is previously extracted from the positioning mosaic image as a processing object of the pattern matching. For example, a finally coupled still image is extracted as the reference image B1. Alternatively, the size of an overlapping area of the still image finally coupled with respect to a retention mosaic image and the present frame image is less than a constant level; and if a relative position between these images cannot be determined, other still image adjacent to the still image finally coupled with respect to the retention mosaic image is extracted as the reference image B1.

In the case where a positional relationship between the reference image B1 and the frame image B2 is unclear, the feature point B3 is extracted by setting the whole of the image as an object. Then, a judgment is made by comparison between the feature points as to whether or not a similar feature point is present in the frame image B2 for the respective feature points B3 extracted from the reference image B1.

The degree of similarity between the feature points can be measured by a predetermined area including the feature point B3, for example, error sum of squares or normalized correlation of a luminance value calculated for a rectangular area of 5 pixels by 5 pixels.

The right correspondence between the feature points is extracted based on such a comparison result. For example, correspondence between the feature points moved in parallel in the same direction is extracted as right correspondence. The relative position between the reference image B1 and the frame image B2 is determined by judging the amount of movement in the image of the feature point based on the right correspondence between the extracted feature points and by judging the amount of movement of the frame image B2 with respect to the reference image B1 from the amount of movement.

Figure 7A:
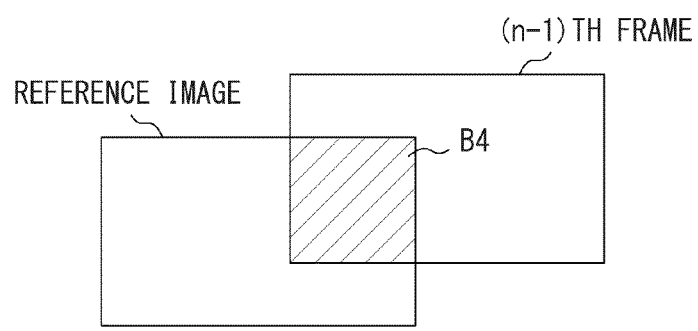
FIGS. 7A and 7B are diagrams each showing an example of operation of pattern matching in the magnification observation device shown in FIG. 1, and showing a state which compares feature points B3 in overlapping areas B5 and B6.
Figure 7B:
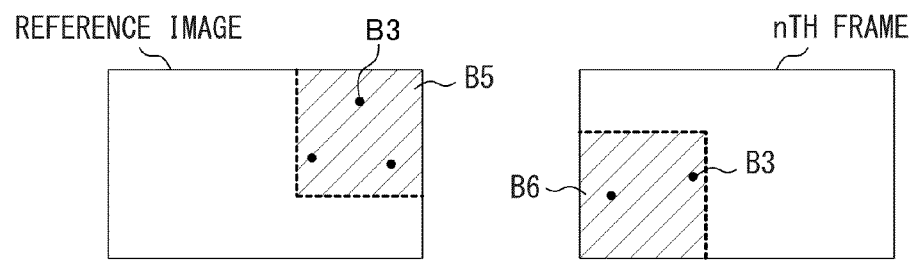

FIGS. 7A and 7B are diagrams each showing an example of operation of pattern matching in the magnification observation device 1 shown in FIG. 1, and there is shown a state in which feature points B3 in overlapping areas B5 and B6 estimated from a relative position between the reference image and an (n−1)th frame image are compared. FIG. 7A shows an overlap area B4 of both images obtained from the relative position between the reference image and the (n−1)th frame image. FIG. 7B shows the overlapping areas B5 and B6 of the reference image and nth frame image estimated from the relative position between the reference image and the (n−1)th frame image.

In the case where a rough positional relationship between the reference image B1 and the frame image B2 is previously known, a template area is appropriately extracted from one image and the vicinity of an area corresponding to the other image is searched; and accordingly, the relative position between these images can be determined with high accuracy.

That is, the overlapping area B4 of these images is obtained from a determination result of the relative position between the (n−1)th frame image previously provided by one frame and the reference image. The overlapping area B4 is judged as the overlapping areas B5 and B6 of the nth frame image and the reference image. Then, similar feature points are extracted from within the overlapping area B6 of the nth frame image for the respective feature points B3 in the overlapping area B5 of the reference image; and accordingly, the relative position between these images is determined.

The extraction of the similar feature points is performed by extracting a predetermined area of the vicinity of a position corresponding to the feature points from the overlapping area B6 of the nth frame image for the respective feature points B3 in the overlapping area B5 of the reference image, and by searching the inside of the area.

In the present preferred embodiment, there is adopted a method shown in FIGS. 7A and 7B, in which comparison is made for the feature points in the overlapping area with respect to positioning of a positioning frame image subsequent to a second frame and a positioning mosaic image. On the other hand, there is adopted a method shown in FIGS. 6A and 6B, in which comparison is made for the whole feature points in the case where the relative position cannot be determined by positioning of a first positioning frame image and the positioning mosaic image and by comparison with respect to the feature points in the overlapping area, or, in the case of positioning of a still image fetched based on a fetch instruction and a retention mosaic image.

Furthermore, in the positioning process which is performed in real time with respect to frame images continuously obtained from the camera 210, when the number of right correspondence of the thus described feature points is less than a constant level, the relative position cannot be determined; and consequently, judgment is made as having failed in positioning.

As the cause of a failure in positioning, there is conceivable a case which cannot detect the feature points necessary for positioning due to the influence of out of focus blur. Furthermore, there is conceivable a case where the overlapping area estimated from the previous positioning result is largely deviated from an actual overlapping area due to too small in the overlap of the reference image and the frame image, or too large in the amount of movement between frames.

Figure 8A:
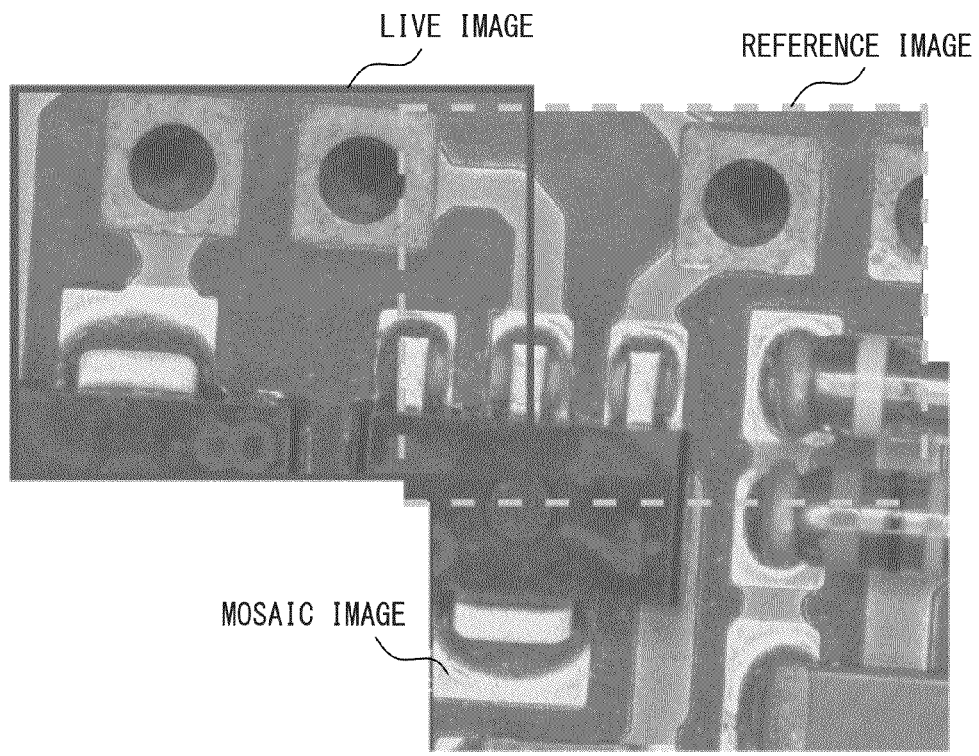
FIGS. 8A and 8B are views each showing an example of operation during displaying a live image in the magnification observation device shown in FIG. 1, and showing a live image positioned with respect to a mosaic image.
Figure 8B:
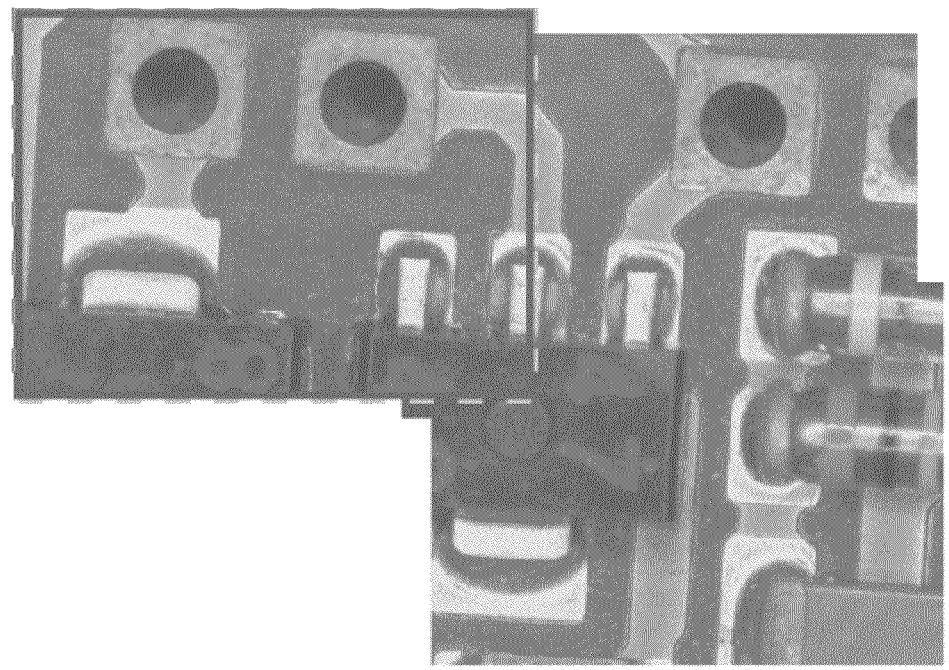

FIGS. 8A and 8B and FIGS. 9A and 9B are views each showing an example of operation during displaying a live image in the magnification observation device 1 shown in FIG. 1, and showing a live screen 111 on which a live image is displayed on a display mosaic image. FIG. 8A shows a live image positioned with respect to a reference image extracted from a mosaic image made of two still images; and FIG. 8B shows a mosaic image updated by fetching and assembling still images with the same visual field as the live image shown in FIG. 8A.

In this example, a positioning reference image extracted from a retention mosaic image is arranged in a rectangular frame shown by a dashed line. This reference image is a still image finally assembled with respect to the retention mosaic image.

On the other hand, the live image is arranged in a rectangular frame shown by a solid line, and a display position of the rectangular frame is decided based on a determination result of a relative position between the reference image and the present positioning frame image. That is, the display position of the live image is changed in response to the relative position of the frame image if succeeded in positioning of the frame image. On the other hand, the display position of the live image is fixed to a position of a final frame image succeeded in positioning if failed in positioning.

If a fetch of an assembling still image is instructed in a state shown in FIG. 8A, the still image with the same visual field as the live image during displaying is fetched, and coupled to the retention mosaic image to create a new retention mosaic image. A display mosaic image during displaying is updated by reducing the new retention mosaic image. At this time, the reference image is also changed to one corresponding to the fetched still image.

Figure 9A:
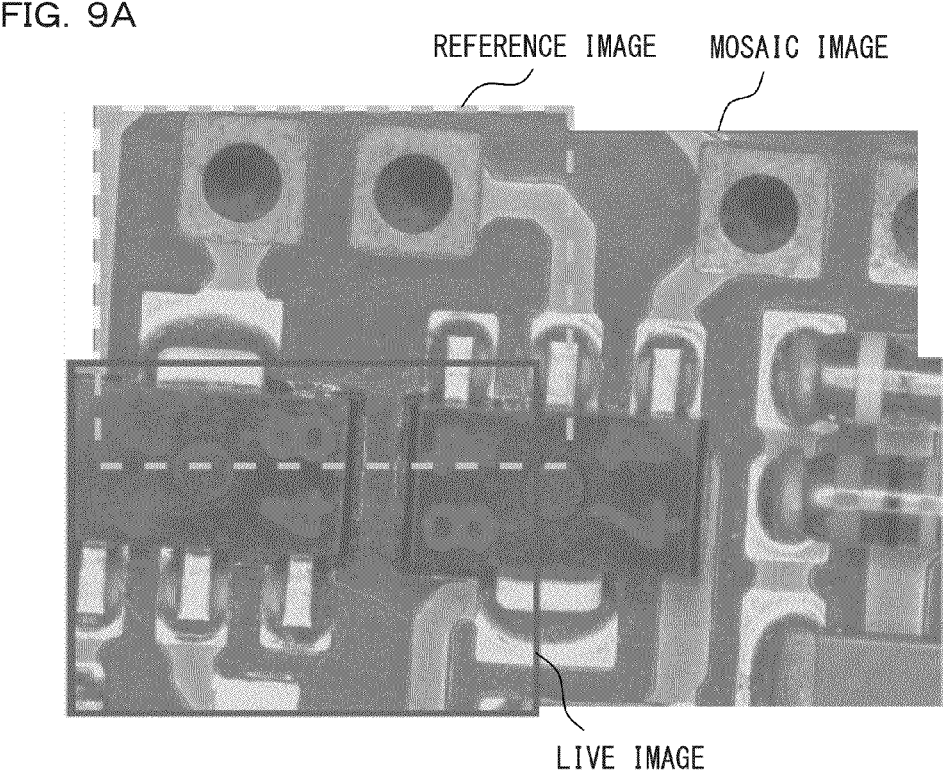
FIGS. 9A and 9B are views each showing an example of operation during displaying a live image in the magnification observation device shown in FIG. 1, and showing a live image positioned with respect to the mosaic image shown in each of FIGS. 8A and 8B.
Figure 9B:
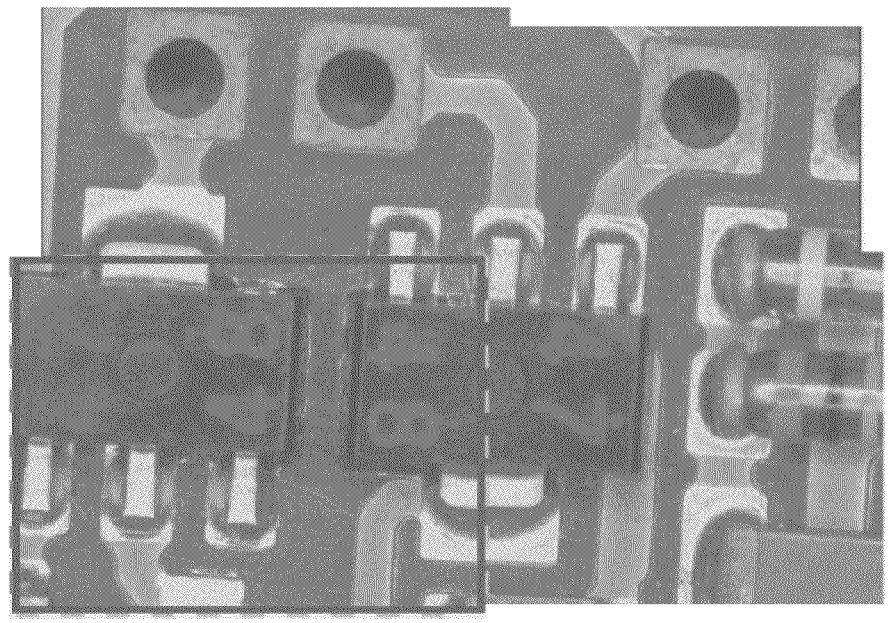

FIG. 9A shows a live image positioned with respect to the reference image extracted from the mosaic image shown in FIG. 8B; and FIG. 9B shows a mosaic image updated by fetching and assembling a still image with the same visual field as the live image shown in FIG. 9A.

The reference image shown in FIG. 9A is a still image finally assembled with respect to the retention mosaic image during creation. If the movable stage 230 is moved in an upward direction from a state shown in FIG. 8B, the field of view during photographing is moved in a downward direction with respect to a work (object to be inspected) and the live image shown in FIG. 9A can be obtained.

If a fetch is instructed in a state shown in FIG. 9A, a still image with the same visual field as the live image during displaying is fetched, and coupled to the retention mosaic image to create a new retention mosaic image. The display mosaic image during displaying is updated by reducing the new retention mosaic image, and the reference image is also changed to one corresponding to the fetched still image.

Figure 10A:
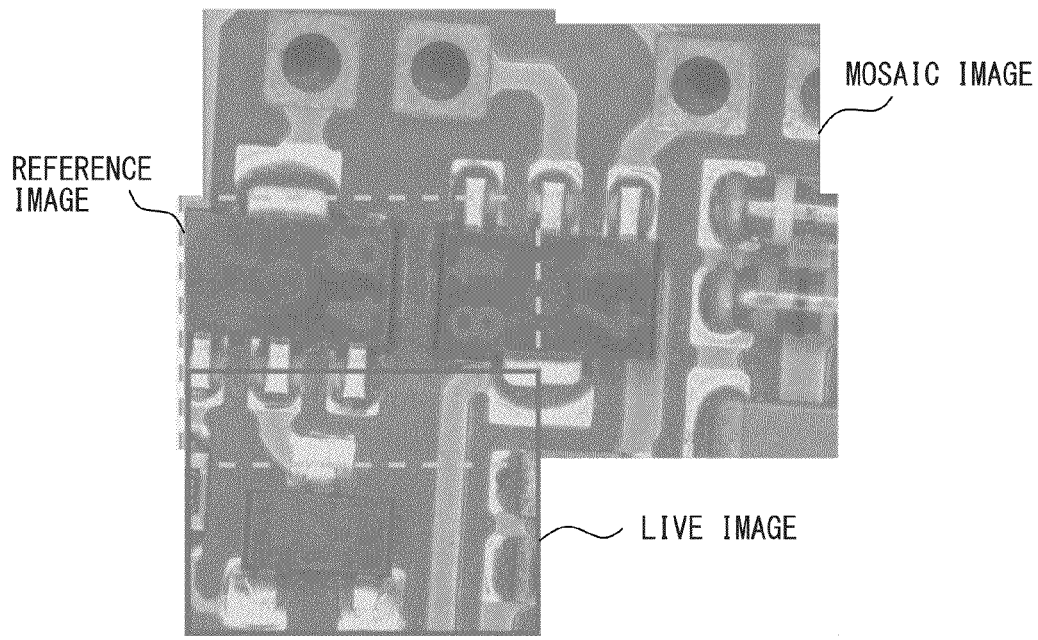
FIGS. 10A and 10B are views each showing an example of operation during displaying a live image in the magnification observation device shown in FIG. 1, and showing a state where a reference image is changed with a movement of a field of view during photographing.
Figure 10B:
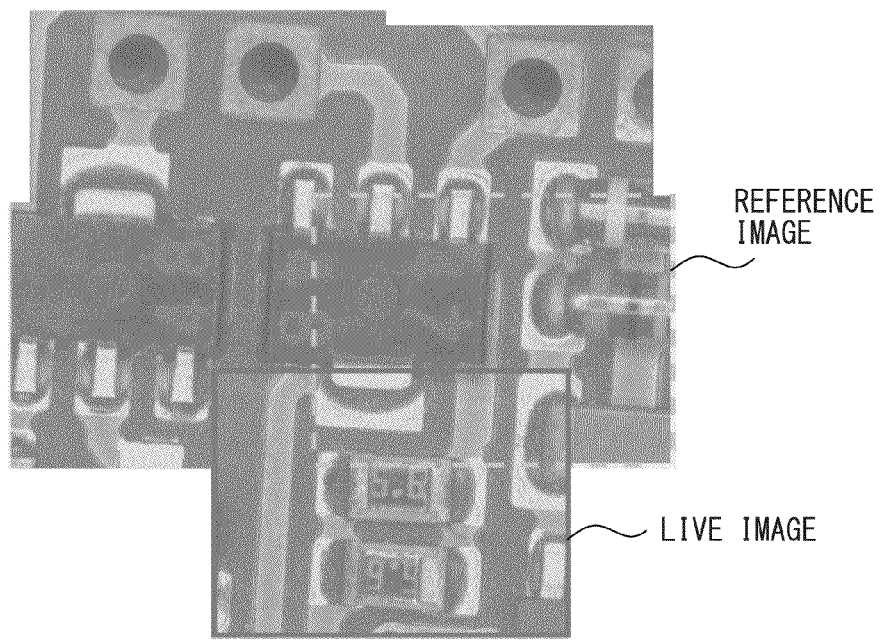

FIGS. 10A and 10B are views each showing an example of operation during displaying a live image in the magnification observation device 1 shown in FIG. 1, and showing a state where a reference image is changed with a movement of a field of view during photographing. FIG. 10A shows a live image in which a still image finally assembled with respect to the mosaic image shown in FIG. 9B is positioned as the reference image. Furthermore, FIG. 10B shows a live image positioned with respect to a reference image which is changed with a movement of a field of view during photographing.

If the movable stage 230 is moved in a left direction from a state shown in FIG. 10A, the field of view during photographing is moved in a right direction with respect to the work. If an overlap of a frame image and the still image finally assembled with respect to the mosaic image becomes small by the visual field movement, the reference image is changed.

More specifically, the reference image is changed from the still image finally assembled with respect to the mosaic image to a still image that is the largest in overlapping area with the frame image, and positioning of the frame image is performed. In this new reference image, an image patch that is the largest in area of the overlapping area with the frame image is selected based on update record and a past positioning result of a display position of the frame image with respect to the mosaic image. In this example, among the still images constituting the mosaic image, a still image adjacent to the right-hand side of the finally assembled still image is selected as the new reference image.

Figure 11A:
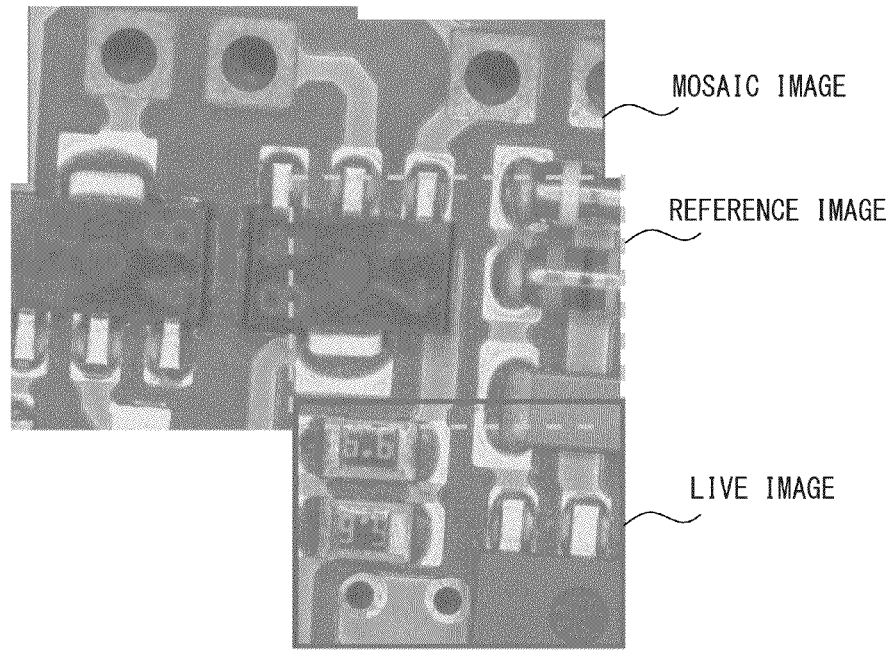
FIGS. 11A and 11B are views each showing an example of operation during displaying a live image in the magnification observation device shown in FIG. 1, and showing a state that failed in positioning of a frame image with a movement of a visual field.
Figure 11B:
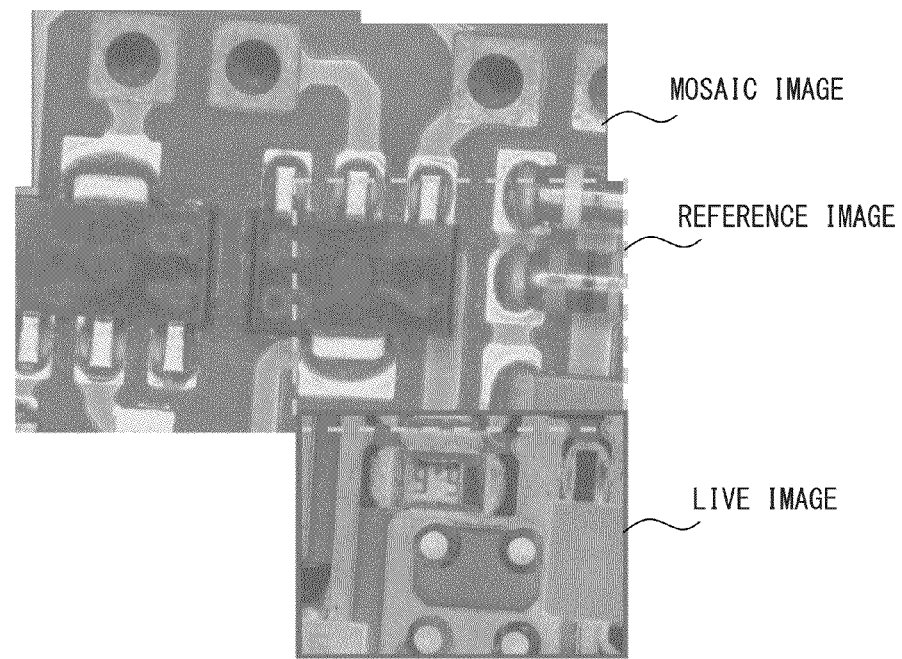

FIGS. 11A and 11B are views each showing an example of operation during displaying a live image in the magnification observation device 1 shown in FIG. 1, and showing a state that failed in positioning of the frame image with a movement of a field of view during photographing. FIG. 11A shows the live image just before failing in positioning; and FIG. 11B shows the live image just after failing in positioning.

The live image shown in FIG. 11A includes a frame image positioned with respect to the reference image shown in FIG. 10B. If the movable stage 230 is moved in a state shown in FIG. 11A, an overlap of the frame image and the reference image becomes small to fail in positioning.

A display position of the frame image after failing in positioning is fixed in the vicinity of a display position of a final frame image succeeded in positioning, and displayed in a display mode different from a case succeeded in positioning.

The display position of the frame image after failing in positioning with respect to the mosaic image may be deviated from the display position of the final frame image succeeded in positioning by approximately several pixels.

If failed in positioning of the frame image, an operation mode is switched from a high speed following mode to a field of view searching mode. Then, as for the frame image obtained after failing in positioning, feature quantity of the whole of a final reference image succeeded in positioning and feature quantity of the whole of the frame image are compared; and accordingly, a relative position is determined.

Figure 12:
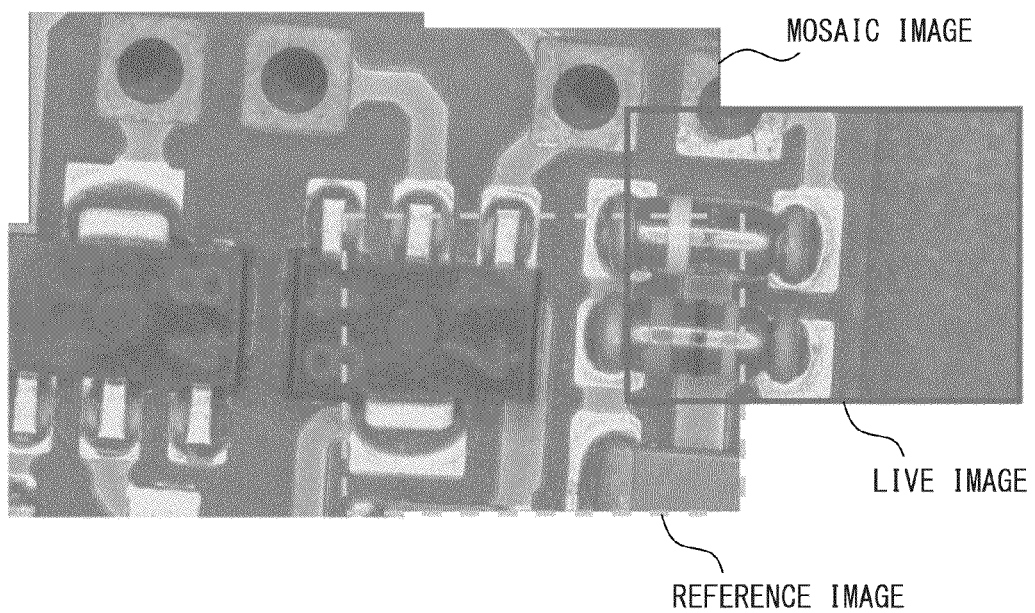
FIG. 12 is a view showing an example of operation during displaying a live image in the magnification observation device shown in FIG. 1, and showing a live image newly positioned after failing in positioning.

FIG. 12 is a view showing an example of operation during displaying a live image in the magnification observation device 1 shown in FIG. 1, and showing a live image newly positioned after failing in positioning. If failed in positioning of the frame image with respect to the reference image shown in FIG. 11, an operation mode is switched to a field of view searching mode by a comparison of feature quantity of the whole of a final reference image succeeded in positioning and feature quantity of the whole of the frame image so as to return from any part of the reference image.

Figure 13:
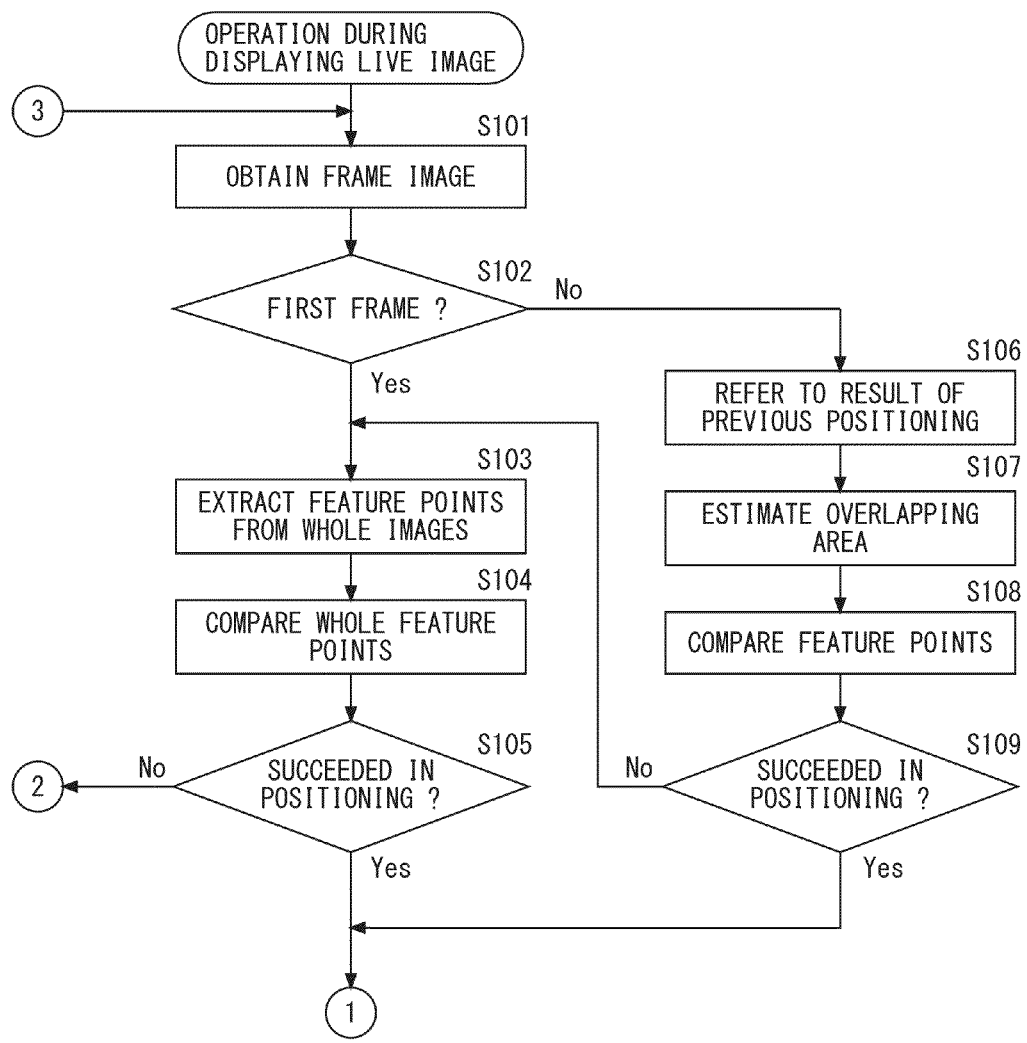
FIG. 13 is a flow chart showing an example of operation during displaying a live image in the magnification observation device shown in FIG. 1.

Steps S101 to S126 shown in FIGS. 13 to 15 are flow charts each showing an example of operation during displaying a live image in the magnification observation device 1 shown in FIG. 1. First, the feature quantity extraction unit 131 obtains a positioning frame image; and extracts feature points from the whole of images if the positioning frame image is a first frame image (steps S101 to S103).

Next, the relative position determination unit 132 compares for the whole feature points included in the whole of the frame image and the whole feature points included in the whole of a reference image; and a relative position between the present positioning frame image and a positioning mosaic image is determined (step S104). At this time, when the relative position can be determined and when succeeded in positioning of the frame image, a display position of the frame image with respect to the mosaic image is changed based on a determination result of the relative position, and the live image is updated (steps S105, S110, and S111).

On the other hand, if the obtained positioning frame image is not the first frame image, the relative position determination unit 132 refers to a result of the previous positioning, that is, a determination result of the relative position between the positioning frame image previously provided by one frame and the positioning mosaic image, and estimates an overlap area between the present positioning frame image and the reference image (steps S102, S106, and S107). The feature quantity extraction unit 131 extracts feature points from the extracted overlapping area.

Next, the relative position determination unit 132 compares the feature points in the overlapping area between the present positioning frame image and the reference image, and determines the relative position between these images (step S108). At this time, if the relative position cannot be determined, a process procedure subsequent to step S103 is executed (step S109). When the relative position can be determined in step S109 and when succeeded in positioning, a display position of the frame image with respect to the mosaic image is changed based on the determination result of the relative position, and the live image is updated (steps S110 and S111).

After updating the live image, if a fetch instruction of an assembling still image is given, the still image is fetched based on the fetch instruction, and positioning is performed by pattern matching with the retention mosaic images (steps S112 and S114). Coupling process is performed between the still image and the retention mosaic image based on the positioning result, and display and retention mosaic images are updated (steps S115 and S116). The process procedure from step S101 to step S116 is repeated until photographing completion is instructed; and when the photographing completion is instructed, the procedure is completed (step S113).

When the relative position cannot be determined in step S105 and when failed in positioning, matching error is notified and the display position of the frame image with respect to the mosaic image is fixed to update the live image (steps S117 to S119). After updating the live image, when the fetch instruction of the still image is given, an error that is not possible to couple is notified (steps S120 and S122).

Next, when photographing completion is instructed, this process is completed (step S121). On the other hand, if the photographing completion is not instructed, the feature quantity extraction unit 131 obtains a new positioning frame image, and extracts the feature points from the whole of the images (steps S121, S123, and S124).

Then, the relative position determination unit 132 compares the whole feature points included in the whole of the frame image and the whole feature points included in the whole of the reference image, and determines the relative position between the present positioning frame image and the repositioning mosaic image (step S125). At this time, if the relative position cannot be determined and if failed in positioning, a process procedure subsequent to step S119 is repeated. On the other hand, when the relative position can be determined and when succeeded in positioning, a process procedure subsequent to step S110 is repeated.

According to the present preferred embodiment, a field of view during photographing is displayed at an appropriate position on the mosaic image during creation as the live image; and therefore, the still image can be fetched to couple to the mosaic image while making a user confirm a positional relationship between the field of view during photographing and the mosaic image during creation. More particularly, the display position of the live image is changed in response to the relative position between the frame image and the mosaic image when succeeded in positioning of the frame image. On the other hand, the display position of the live image is not changed when failed in positioning; and therefore, the display position can be fixed by the final frame image succeeded in positioning.

Accordingly, in the case of displaying the field of view during photographing at an appropriate position on the mosaic image as the live image, after failed in positioning, the display position of the live image is retained while being fixed even when the visual field is moved; and therefore, it becomes possible to recognize that it has failed in positioning of the frame image. Furthermore, the relative position between these images is determined by comparison of the feature points extracted from the frame image and the mosaic image; and therefore, it becomes possible to suppress system configuration from being complicated.

Further, in the case of displaying the field of view during photographing at an appropriate position on the mosaic image as the live image, the display position of the moving picture image is fixed in the vicinity of the display position of the frame image finally determined as having succeeded in positioning; and therefore, the field of view during photographing can be easily returned to a position that is capable of positioning.

Incidentally, in the present preferred embodiment, the description is made about the example where, for the frame image after failed in positioning, the relative position is determined by the comparison of the feature quantity of the whole of the final reference image succeeded in positioning of the frame image and the feature quantity of the whole of the frame image; however, the present invention is not limited to this. For example, the present invention includes the case where, for the frame image obtained after failing in positioning, the relative position between the frame image and the mosaic image is determined by comparing the feature quantity included in a peripheral portion of the mosaic image and the feature quantity of the whole of the frame image.

Besides, in the present preferred embodiment, the description is made about the example where the reference image is changed as needed so as to be the largest in area of the overlapping area with the frame image; however, the present invention is not limited. For example, in the case where the relative position cannot be determined even by the comparison of the feature point of the whole of the positioning frame image and the feature point of the whole of the reference image, the relative position may be determined by changing the reference image and by comparing the feature point of the whole of the changed reference image and the feature point of the whole of the positioning frame image. In this case, if the relative position cannot be determined even when the reference image is changed, judgment is made that it has failed in positioning of the frame image. Furthermore, for the frame image obtained after failing in positioning of the frame image, the relative position is determined by comparing the feature quantity of the whole of the final reference image succeeded in positioning and the feature quantity of the whole of the positioning frame image.

Further, in the present preferred embodiment, the description is made about the example where the top in which edges are intersected is extracted as the feature quantity in the case of comparing the positioning frame image and the positioning mosaic image; however, the present invention is not limited to this. For example, for the predetermined area on the image, contrast values in the area may be extracted from the positioning frame image and the positioning mosaic image as the feature quantity, respectively, and may be compared between these images. Furthermore, template matching may be executed based on the feature quantity in the area for the predetermined area in the overlapping area without extracting the edges and contrast.

In addition, in the present preferred embodiment, the description is made about the example where, by pattern matching between the positioning mosaic image and the frame image, a relative positional relationship between these images is judged; however, the present invention is not limited to this. For example, in the present invention, there is also included one in which a position sensor that detects a position in an x axis direction and a Y axis direction of the movable stage 230 is equipped and a relative position between the frame image and the mosaic image is determined based on an output of the position sensor.

Generally, in the case of making a join less noticeable by a blending process when the still image is coupled to the retention mosaic image, in order to smoothly join with smoothness not less than a constant level, not less than a constant amount of an overlapping area between the still image and the retention mosaic image needs to be present. Consequently, in the imaging device which determines the relative position between the frame image and the mosaic image based on an output of the position sensor, in the case where the still image corresponding to the present frame image cannot be smoothly coupled to the mosaic image, it is conceivable that the display position of the live image is fixed.

If, in such a configuration, in the case where the still image having the same visual field as the live image cannot be smoothly coupled to the mosaic image, the display position of the live image is fixed; and therefore, a user can recognize that the field of view during photographing cannot be smoothly coupled to the mosaic image during creation.

What is claimed is:

1. An imaging device comprising:
   a movable stage capable of moving in two different directions while mounting an object to be inspected;
   a camera which is arranged in face-to-face relation to the movable stage, photographs the object to be inspected, and generates a moving picture image made of a plurality of continuous frame images;
   a mosaic image generation unit which assembles not less than two still images photographed by the camera, and generates a mosaic image that is wider in field of view than an actual field of view of the camera;
   a feature quantity extraction unit which extracts feature quantity from the frame image and the mosaic image;
   a relative position determination unit which determines a relative position between the frame image and the mosaic image by comparison of the feature quantity; and
   a live image display unit which updates a display position of the frame image with respect to the mosaic image based on a determination result of the relative position, and displays the moving picture image on the mosaic image, wherein
   the live image display unit changes the display position in response to the relative position when determined as having succeeded in positioning of the frame image by the relative position determination unit, and fixes the display position when determined as having failed in positioning of the frame image, and wherein the live image display unit fixes the display position near a display position of a final frame image determined as having succeeded in positioning.

2. The imaging device according to claim 1, wherein
after failing in positioning of the frame image, the live image display unit fixes the display position of a newly obtained frame image to the display position of the final frame image, and updates the frame image displayed at the display position to the newly obtained frame image, so that the display of the moving picture image is continued.

3. The imaging device according to claim 1, wherein
in the case of extracting the feature quantity from the mosaic image, the feature quantity extraction unit sets a still image finally assembled with respect to the mosaic image as a reference image and extracts feature quantity in the reference image; and wherein,
for a frame image to be obtained after failing in positioning of the frame image, the relative position determination unit determines a relative position between the frame image and the mosaic image by comparing the feature quantity in the frame image and the feature quantity in the reference image, and
determines the relative position by comparing the feature quantity in the frame image and feature quantity in an image area of the mosaic image excluding the reference image in the case where the relative position cannot be determined by the comparison with the feature quantity in the reference image.

4. The imaging device according to claim 3, wherein
in the case where the relative position cannot be determined even by the comparison of feature quantity of the whole of the frame image and feature quantity of the whole of the reference image, the relative position determination unit sets a still image adjacent to the still image finally assembled with respect to the mosaic image as a reference image and determines the relative position by comparing feature quantity of the whole of this reference image and the feature quantity of the whole of the frame image.

5. The imaging device according to claim 3, wherein
for a frame image obtained after failing in positioning, the relative position determination unit determines the relative position by comparing feature quantity included in a peripheral portion of the mosaic image and feature quantity of the whole of the frame image.

6. The imaging device according to claim 1, wherein
in the case of extracting feature quantity from the mosaic image, the feature quantity extraction unit sets a still image finally assembled with respect to the mosaic image as a reference image and extracts feature quantity in the reference image; and wherein
the relative position determination unit estimates an overlapping area between the frame image and the reference image based on a past determination result of a relative position and determines the relative position by comparing feature quantity in the overlapping area, and
determines the relative position by comparing feature quantity of the whole of the frame image with feature quantity of the whole of the reference image in the case where the relative position cannot be determined by the comparison of the feature quantity in the overlapping area.

7. The imaging device according to claim 1, wherein
the live image display unit displays in a display mode different from the case where the frame image determined as having failed in positioning is determined as having succeeded.

8. The imaging device according to claim 1, further comprising:
   a positioning reduction section which reduces the frame image constituting the moving picture image and generates a positioning frame image, and reduces the mosaic image and generates a positioning mosaic image; and a display reduction unit which reduces a frame image constituting the moving picture image and generates a display frame image, and reduces the mosaic image and generates a display mosaic image, and wherein the feature quantity extraction unit extracts feature quantity from the positioning frame image and the positioning mosaic image;

the relative position determination unit determines a relative position between the positioning frame image and the positioning mosaic image;

the live image display unit displays the moving picture image configured by the display frame image on the display mosaic image as a live image; and the mosaic image generation unit estimates the relative position between the frame image and the mosaic image by higher resolution than the positioning mosaic image and assembles the frame image to the mosaic image and generates a new mosaic image.

9. An imaging device comprising:

a movable stage capable of moving in two different directions while mounting an object to be inspected;

a position sensor which detects a position of the movable stage;

a camera which is arranged in face-to-face relation to the movable stage, photographs the object to be inspected, and generates a moving picture image made of a plurality of sequential frame images;

a mosaic image generation unit which assembles not less than two still images photographed by the camera, and generates a mosaic image that is wider in field of view than an actual field of view of the camera;

a relative position determination unit which determines a relative position between the frame image and the mosaic image based on output of the position sensor; and a live image display unit which updates a display position of the frame image with respect to the mosaic image based on a determination result of the relative position, and displays the moving picture image on the mosaic image, wherein in the case where the still image corresponding to the frame image cannot be smoothly coupled to the mosaic image, the live image display unit fixes the display position, and wherein the live image display unit fixes the display position near a display position of a final frame image determined as having succeeded in positioning.

* * * * *